(12) United States Patent
Bonin et al.

(10) Patent No.: US 6,459,260 B1
(45) Date of Patent: Oct. 1, 2002

(54) HEAD SUSPENSION ASSEMBLY FOR TESTING A SLIDER

(75) Inventors: Wayne A. Bonin, North Oak, MN (US); Roger L. Hipwell, Jr., Eden Prairie, MN (US); Zine-Eddine Boutaghou, Vadnais Heights, MN (US); Michael S. Bowers, Bloomington, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/024,785

(22) Filed: Dec. 19, 2001

Related U.S. Application Data (60) Provisional application No. 60/297,541, filed on Jun. 12, 2001, provisional application No. 60/297,666, filed on Jun. 12, 2001, and provisional application No. 60/317,776, filed on Sep. 6, 2001.

(51) Int. Cl.[7] .............................................. G01R 3/102
(52) U.S. Cl. .................. 324/158.1; 324/755; 29/603.03
(58) Field of Search .............................. 324/158.1, 754, 324/755, 210, 212, 262; 360/128, 129, 234.6, 245.8, 245.9; 29/603.01, 603.03, 603.04

(56) References Cited

U.S. PATENT DOCUMENTS

| 5,844,420 A | * | 12/1998 | Weber et al. ................ 324/754 |
| 5,924,187 A | | 7/1999 | Matz ........................ 29/603.03 |
| 5,933,293 A | | 8/1999 | Bennin ..................... 360/245.9 |
| 6,046,887 A | | 4/2000 | Uozumi et al. ........... 360/245.9 |
| 6,140,815 A | * | 10/2000 | Greene et al. .............. 324/262 |
| 6,151,196 A | | 11/2000 | Carlson et al. .......... 360/245.9 |
| 6,201,668 B1 | | 3/2001 | Murphy ................... 360/294.4 |
| 6,237,215 B1 | * | 5/2001 | Hunsaker et al. ........ 29/603.06 |
| 6,288,877 B1 | | 9/2001 | Khan et al. .............. 360/245.9 |

* cited by examiner

*Primary Examiner*—Ernest Karlsen
(74) *Attorney, Agent, or Firm*—Westman, Champlin & Kelly (57) ABSTRACT

A head suspension assembly for a slider tester is provided, which includes a socket that is coupled to a gimbal and load beam. The assembly also includes an electrical interconnect. The socket is adapted to releasably secure a slider and to electrically couple the electrical interconnect to the slider.

28 Claims, 9 Drawing Sheets

HEAD SUSPENSION ASSEMBLY FOR TESTING A SLIDER

CROSS-REFERENCE TO RELATED APPLICATION

The present application claims priority benefits from U.S. Provisional Application Serial No. 60/297,541, filed on Jun. 12, 2001 and entitled "LOW COST ELECTRICAL TESTER," incorporated herein by reference; from U.S. Provisional Application Serial No. 60/297,666, filed on Jun. 12, 2001 and entitled "MOTHERSHIP II: ELECTRICAL AND FLYABLE SLIDER" incorporated herein by reference and from U.S. Provisional Application Serial No. 60/317,776, filed Sep. 6, 2001 and entitled "FLYABLE SLIDER TEST SOCKET FOR PRE HSA TESTING" incorporated herein by reference.

FIELD OF THE INVENTION

The present invention relates to disc drive data storage devices. More specifically, the present invention is related to a head suspension assembly for a slider tester used to test sliders that are employed in disc drive storage devices.

BACKGROUND OF THE INVENTION

In a disc drive, data is stored on a storage disc in concentric tracks. In many drives, the data is stored using a write head that changes a physical property of the disc. The data is read from the disc by positioning a read head over a desired track and sensing the physical properties of the disc along the track. For example, in a magnetic disc drive, the read head senses magnetic moment boundaries along the disc.

The process for producing a read head or a write head varies depending upon the type of read head or write head being produced. Nonetheless, all head manufacturing methods share common characteristics, such as high degree of manufacturing complexity, small feature sizes, and a susceptibility to manufacturing errors. Because of this, each production method generates some heads that do not meet specifications. In order to detect faulty heads accurately, the transducing heads must be tested over a disc surface. In particular, each transducing head must be flown over a disc surface while it performs writing and/or reading operations. Early in the disc drive manufacturing art, this type of testing was performed after the head was assembled in a complete disc drive. However, this in-drive testing proved to be unacceptable because the disc drive had to be rebuilt if the head was found to be faulty.

To overcome the ineffectiveness of in-drive testing, the art developed a "spin-stand" which allowed a head-gimbal assembly (HGA) to be tested before it was placed in a disc drive. An HGA includes a slider having a transducing head, an armature (beam and gimbal strut) for positioning the slider, and a flexible circuit that carries electrical signals between the head and drive electronics. In general, a spin-stand includes a spinning computer disc and a mounting support that supports the HGA and moves the transducing head to a desired position over the spinning disc. Of all the constituent parts of the HGA, the transducer is the most delicately fabricated component. The spin-stand allows a series of tests to be performed on the transducing head including, for example, error-rate testing, pulse width-fifty testing, track average amplitude testing and track scan testing. Often, the failure of the HGA is due to the electrical malfunctioning of the transducer. Since the components of the HGA are permanently attached, the entire assembly had to be rejected if a transducer is found to be defective. Rejecting the entire assembly which includes the base plate, load beam, gimbal strut and flex circuit in addition to the slider with the embedded transducer is wasteful, unnecessarily increasing manufacturing costs.

There is also a trend toward new HGA designs which include active integrated circuits disposed near the transducer. For example, integrated circuits may be placed on the flex circuit on the load beam. Weak signals picked up by the transducer are immediately amplified by the integrated circuits before the next stage of signal amplification during data reading, for instance. Placing the active circuits close to the transducer substantially improves the signal-to-noise ratio of the HGA. Adopting the prior art approach of testing the HGA would further aggravate the situation and is even more wasteful because the active circuits also need to be discarded in the event of test failure.

The present invention addresses these problems, and offers other advantages over the prior art.

SUMMARY OF THE INVENTION

A head suspension assembly for a slider tester is provided, which includes a socket that is coupled to a gimbal and load beam. The assembly also includes an electrical interconnect, such as a flex circuit or other wiring, that workers skilled in the art will recognize. The socket is adapted to releasably secure a slider and to electrically couple the electrical interconnect to the slider.

These and various other features as well as advantages which characterize the present invention will be apparent upon reading of the following detailed description and review of the associated drawings.

BRIEF DESCRIPTION OF THE DRAWINGS

FIGS. 4-1 through 4-6 illustrate top and sectional views of a portion of the socket in opened and closed positions.

DETAILED DESCRIPTION

Figure 1:
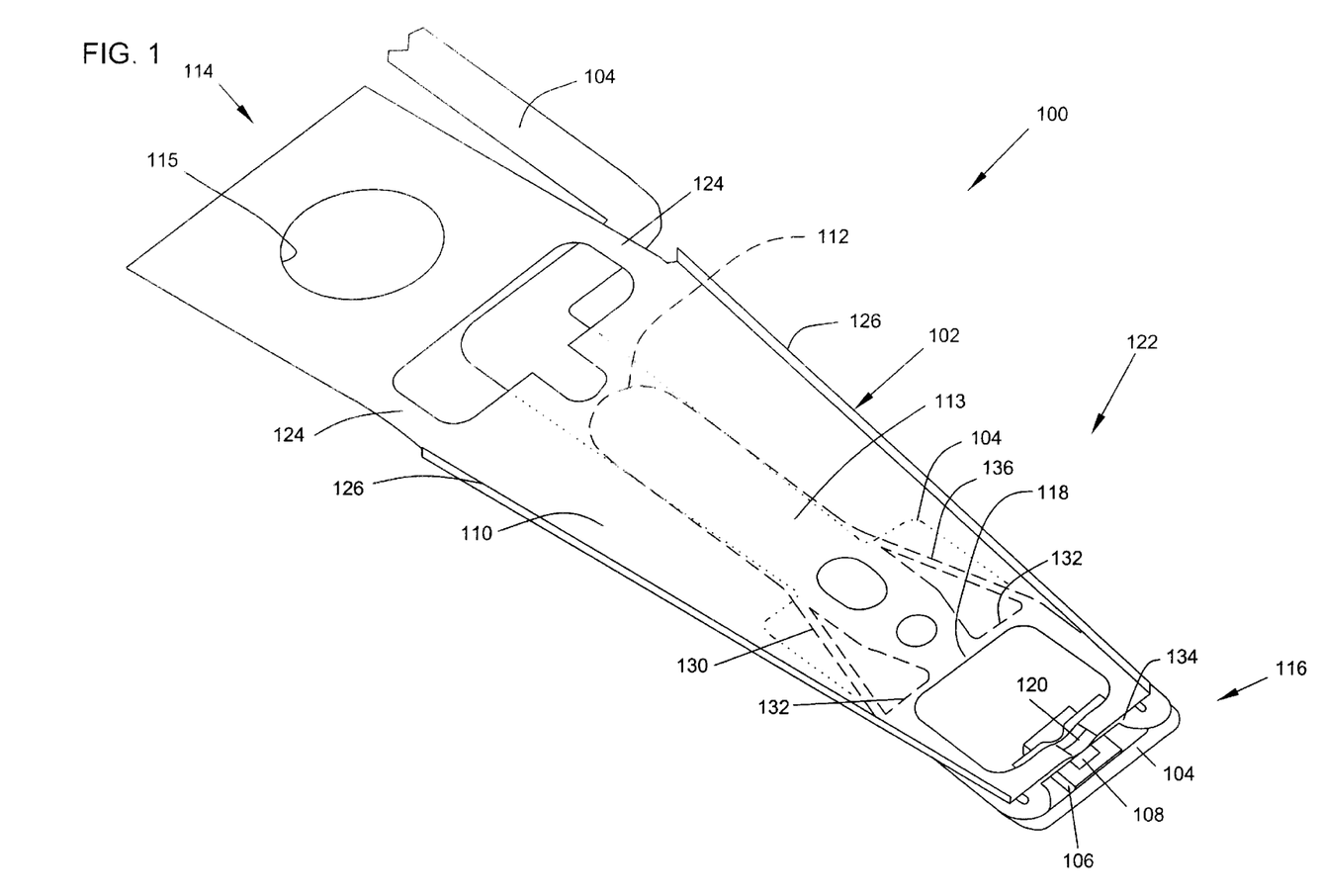
FIG. 1 is a top view of a head suspension assembly of the present invention.

FIG. 1 is a top view of a head suspension assembly 100 in accordance with an embodiment of the present invention. Head suspension 100 includes load beam assembly 102, a flex circuit 104 and a socket 106 that releasably secures slider 108. Load beam assembly 102 includes beam 110 and gimbal 112. Beam 110 is preferably formed of stainless steel and extends from a first end 114 that includes a mounting hole 115 to a second end 116 that includes a window frame 118, exaggerated in size for illustration, and a preload dimple 120 in a gimbal region 122. Beam 110 includes preload spring regions 124, which generate the preload force that is applied at the preload dimple 120. The main body of beam 110 includes side rails 126 that extend along the window frame 118. Gimbal 112 is typically formed of stainless steel. Gimbal 112 has a main body 113 that extends to a pair of braces 130 and a pair of tethers 132, which support a bridge 134 at the end of gimbal 112. Gimbal 112 includes an opening, which aligns with the opening in the window frame 118 of beam 110. Socket 106 is bonded to bridge 134 of gimbal 112. The assembly of the head suspension 100 near the second end 116 of beam 110 is somewhat complex, and is enlarged and illustrated in more detail below in FIG. 2.

Figure 2:
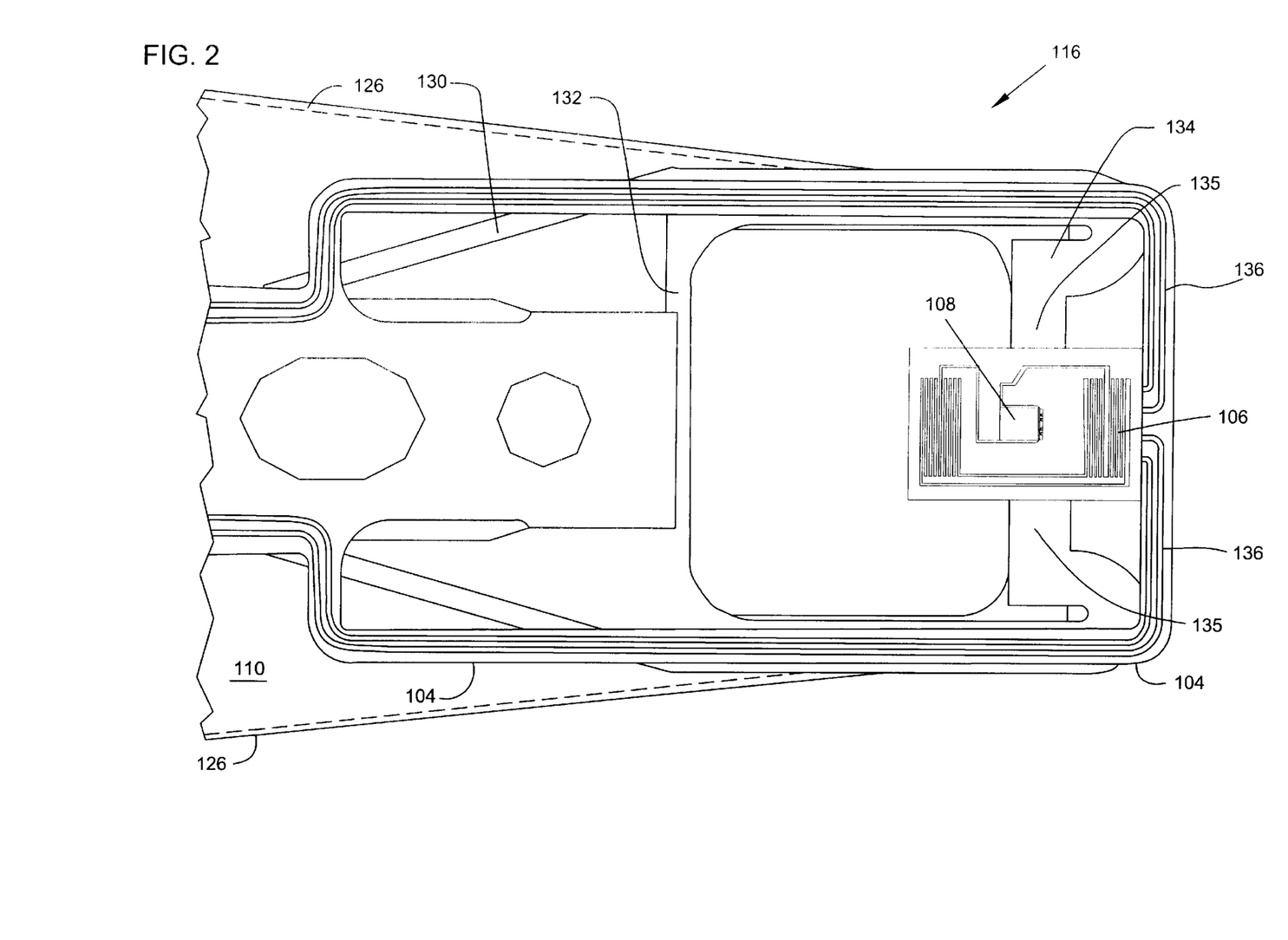
FIG. 2 is a bottom view of a portion of the head suspension assembly of FIG. 1.

FIG. 2 illustrates a bottom view of a portion of the head suspension assembly 100 at the second end 116 of the beam 110. The flex circuit 104 has connections 136 that turn inwardly to make connection to electrical contacts (not illustrated here) on the main body of socket 106. Socket 106 is bonded to bridge 134 at region 135. Slider 108 is releasably secured to socket 106 and can therefore be easily inserted and removed for testing. Details of socket 106 are described in connection with FIG. 3 below.

Figure 3:
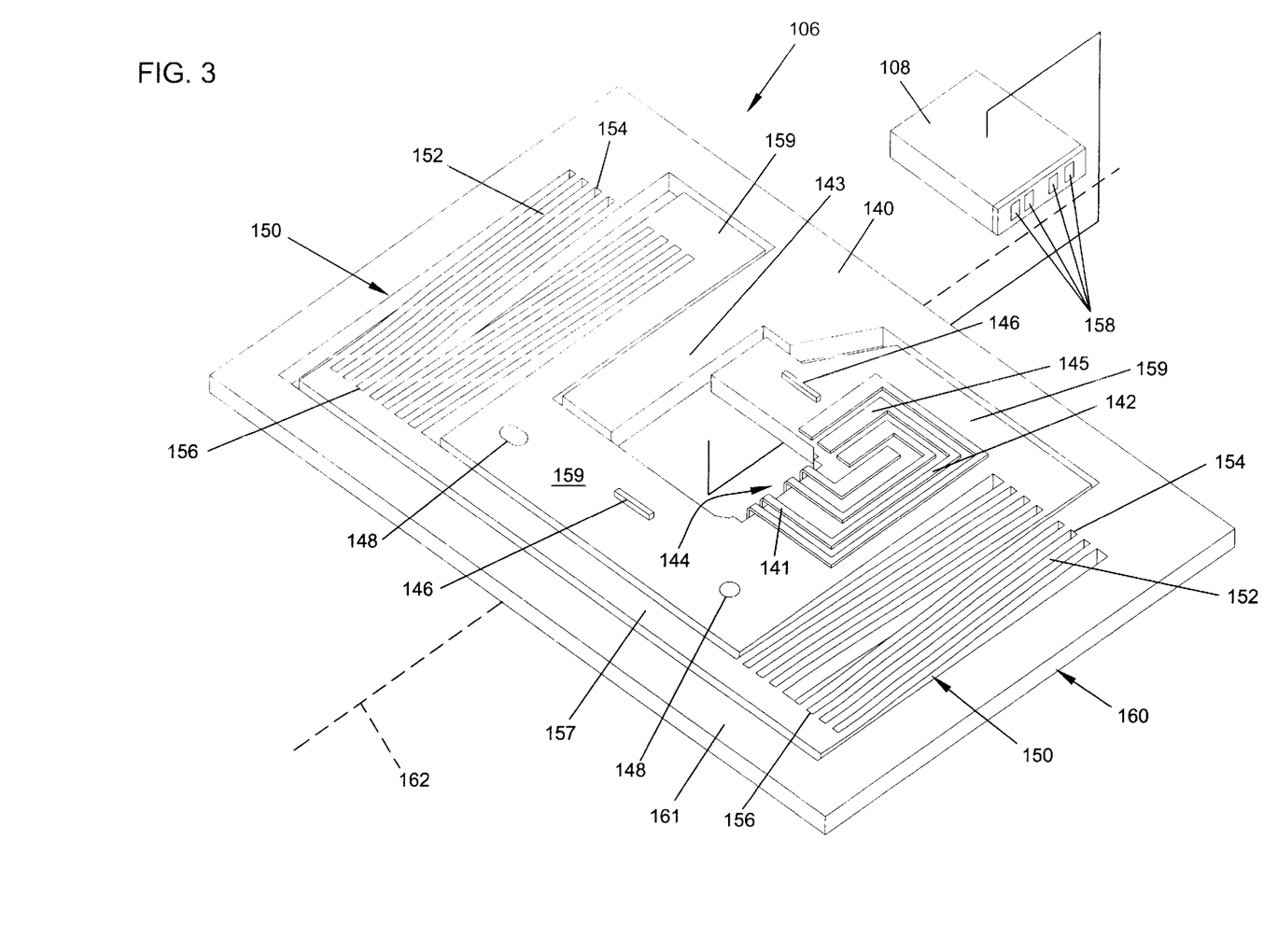
FIG. 3 is an exploded view showing the relationship between a socket and a slider.

FIG. 3 is an exploded view showing the relationship between socket 106 and slider 108. Socket 106 allows for rapid and easy insertion and removal of slider 108 for testing. Socket 106 is a micro-electro-mechanical system (MEMS) that includes a main body 140 and electrical contacts 142 which are etched separately and bonded to main body 140 with adhesive to provide electrical connection to slider 108. Main body 140 is usually formed from silicon and includes a clamp bar 143 and a contact region 144. Slider 108 is releasably secured between clamp bar 143 and contact region 144. Clamp bar 143 is urged against slider 108 with the help of beam springs 150. Individual beams 152 of beam springs 150 extend longitudinally between first ends 154 and second ends 156. Individual beams 152 of this embodiment are usually of a uniform cross section along a longitudinal axis 162 between first ends 154 and second ends 156. First ends 141 of contacts 142 are bent down into contact region 144 to match up with bond pads 158 on slider 108 and are flexible enough to allow proper deflection required for reliable electrical contact to all bond pads without undergoing plastic deformation. Flex circuit 104 (FIGS. 1 and 2) connects to second ends 145 of contacts 142. Other electrical interconnections, such as individual wires, may be used in place of flex circuit 104. Standoffs 146, included on main body 140, bond to bridge regions 135 (FIG. 2) of gimbal 112 (FIGS. 1 and 2). Locating features, such as holes 148, are provided for pinning socket 106 to a fixture plate (not shown) which helps in loading and unloading of slider 108.

Socket 106 is opened to accept slider 108 by applying a force on main body 140 in a direction shown by arrow 160. After slider 108 is placed between clamp bar 143 and contact region 144 and the force in direction 160 is removed, the slider 108 is firmly held between clamp bar 143 and contact region 144. Springs 150 urge the clamp bar 143 against slider 108, such that electrical contacts 142 are electrically coupled to bond pads 158. Springs 150 in socket 106 are designed to provide a relatively large linear opening and closing (200 μm/0.008 inch) travel range in a direction perpendicular to axis 162 without undesirable motion in other directions.

In the embodiment of FIG. 3, main body 140 includes a shuttle bar 157, a fixed member 159 and a rotor 161. Inclusion of shuttle bar 157 provides what is known to those skilled in the art as a folded beam structure. A portion (generally half) of the beams have one end connected to fixed member 159, with the other ends of the beams connected to shuttle bar 157. The remaining beams have one end connected to shuttle bar 157 and remaining ends connected to rotor 161. With this configuration, the mechanical foreshortening of the beams in the length direction caused by bending of the beams results in a small motion of shuttle bar 157 along axis 162, but no motion of rotor 161 with respect to fixed member 159 along axis 162. This provides for the desired straight line opening and closing of clamp bar 143 perpendicular to axis 162, with no sideways twisting of slider 108 as clamp bar 143 closes on it. Typically, the individual beams 152 of springs 150 are 2–3 mm long between first ends 154 and second ends 156. Springs with beams 152 that are about 2 mm long provide a clamping force of about 35 grams on slider 108, and the longer beam springs (about 3 mm) provide a clamping force of about 10 grams.

FIGS. 4-1 through 4-6 illustrate top and sectional views of a portion of socket 106 in opened and closed positions. FIGS. 4-1 through 4-3 show top, side and perspective views of socket 106 in an open position, and FIGS. 4-4 through 4-6 show the same views with socket 106 is a closed position. FIG. 4-6 shows slider bond pads 158 electrically coupled to contacts 142. As mentioned above, contacts 142 are etched separately and bonded with adhesive to main body 140 of socket 106.

Figure 5:
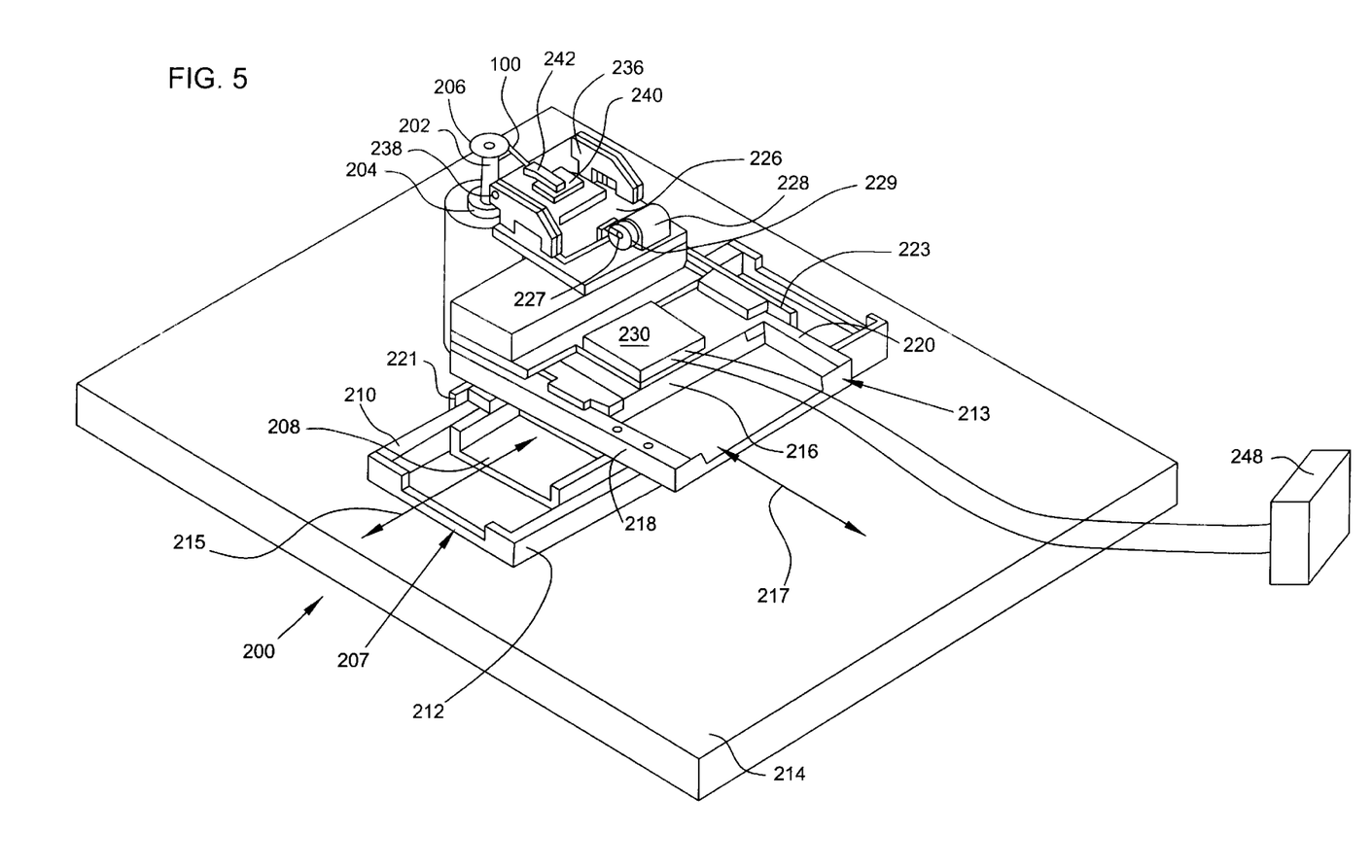
FIG. 5 is a slider tester with which the present invention is useful.

FIG. 5 is a perspective view of an example of a slider tester which incorporates head suspension assembly 100 of the present invention. Slider tester 200 includes disc 206 mounted on spindle 202, which is rotated by spindle motor 204. Spindle motor 204 rests on base 214 located directly below platform 208. Base 214 typically includes a heavy granite block to provide mechanical stability. Head suspension assembly 100 is positioned over disc 206 by "X" direction positioning mechanism 207 and "Y" direction positioning mechanism 213. "X" positioning mechanism 207 includes platform 208 which moves between guide rails 210 and 212. For purposes of reference, movement of platform 208 along guides 210 and 212 is considered to be in the "X" direction as shown by arrows 215. "Y" positioning mechanism 213 includes a carriage 216 that moves between rails 218 and 220 in the "Y" direction as indicated by arrows 217.

Platform 208 can be supported by a cushion of air during movement, and can be stabilized in a particular position by the application of a vacuum between platform 208 and granite base 214 located directly below platform 208. Similar to platform 208, carriage 216 can be supported by a cushion air during movement and locked into position by application of a vacuum. Position encoders 221 and 223 can be located, respectively, along guide 210 to provide an indication of the position of platform 208 and along guide 220 to provide an indication of the position of carriage 216.

Carriage 216 and platform 208 may be actuated by servo motors or stepper motors mounted between one of the guide rails and the respective platform or carriage. Other types of motors, such as linear motors with the magnetic actuating structure built into the guide rails and platforms, may be used. These motors generally perform coarse adjustment of head suspension assembly 100 which is connected to a suspension chuck 242. Suspension chuck 242 may be mounted to fine positioning platform 240. Fine positioning platform 240 is connected to suspension chuck 242 through piezo elements or a voice coil actuator or other mechanism that is able to move suspension chuck 242 in the X direction to perform fine adjustment of a transducing head with respect to disc 106.

During head suspension loading operations, pivot motor 228 rotates eccentric cam 229 causing lever arm 227 and the back end of pivoting platform 226 to rotate upward about pivot pins 236, 238. Suspension chuck 242, which carries suspension 244, is then placed on piezo platform 240 and spindle motor 204 is activated so that disc 206 rotates at a desired speed. Carriage 216 can be moved forward so that the slider 108 (FIGS. 1 and 2) at the end of suspension 100 moves under the spinning disc 206. Support platform 208 is also moved so that slider 108 is positioned at a desired radius along disc 206. When the slider 108 nears the desired location relative to disc 206, motor 228 rotates eccentric cam 229 back so that pivoting platform 226 returns to its level position and the head is brought into proximity with disc 206. The head suspension 100 then flies over a surface of disc 206. If fine positioning platform 240 is not included, suspension chuck 242 may be mounted directly on pivoting platform 226.

The head suspension 100 is connected by electrical leads to printed circuit 230, which has further connections to control box 248. Control box 248 controls the positioning of the head suspension 100 and the types of tests that are performed on the slider 108. In particular, control box 248 designates the location for the test track, the data to be written to the disc, and the position of the read head within the written track during read back of the test data. Using fine positioning platform 240, the slider 108 can be moved to a number of different locations within a track during read back, so that a profile of the off track sensitivity of the read element of slider 108 can be determined.

Figure 6:
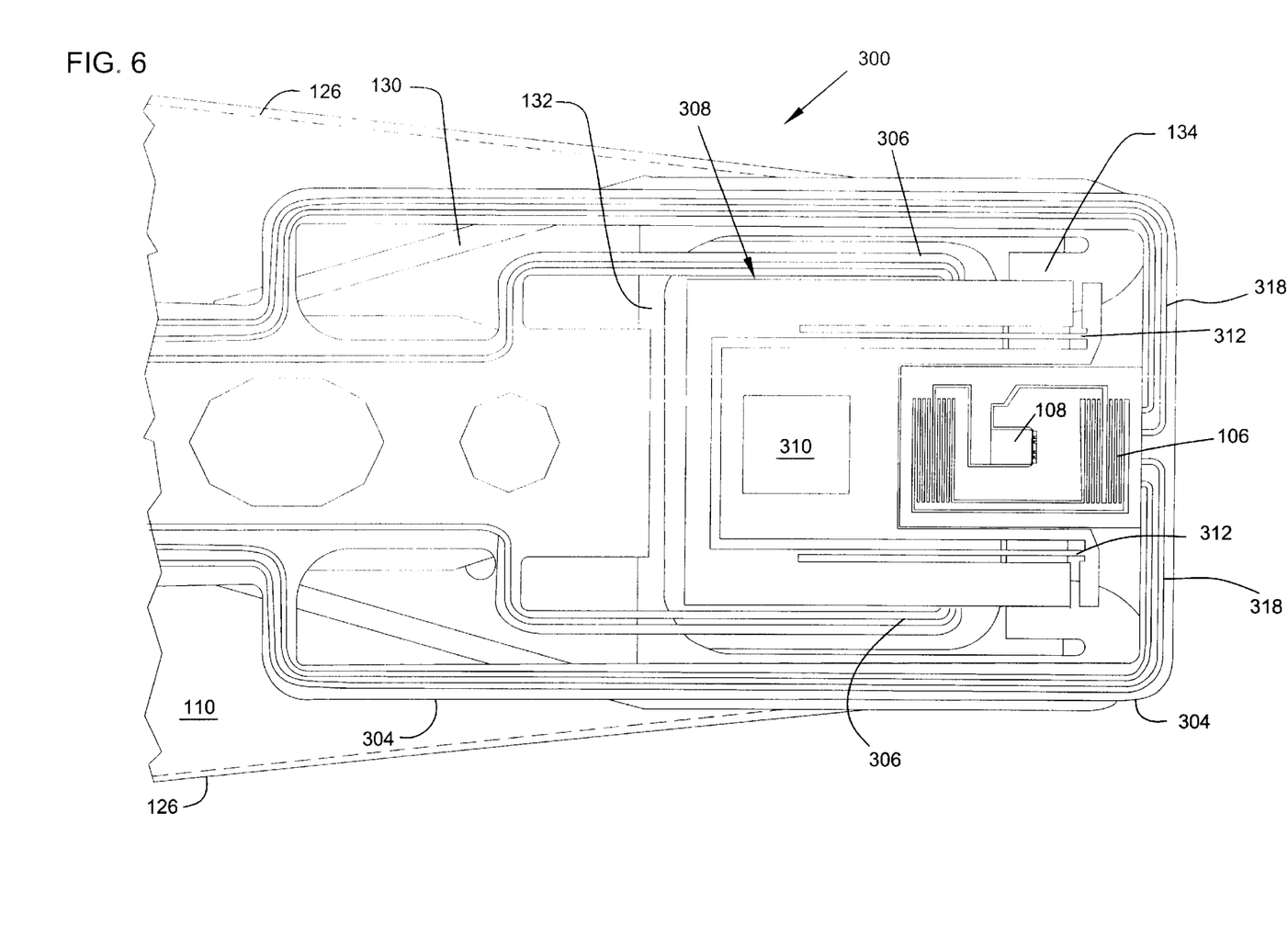
FIG. 6 is a bottom view of a portion of a head suspension assembly including a microactuator in the gimbal region.
Figure 7:
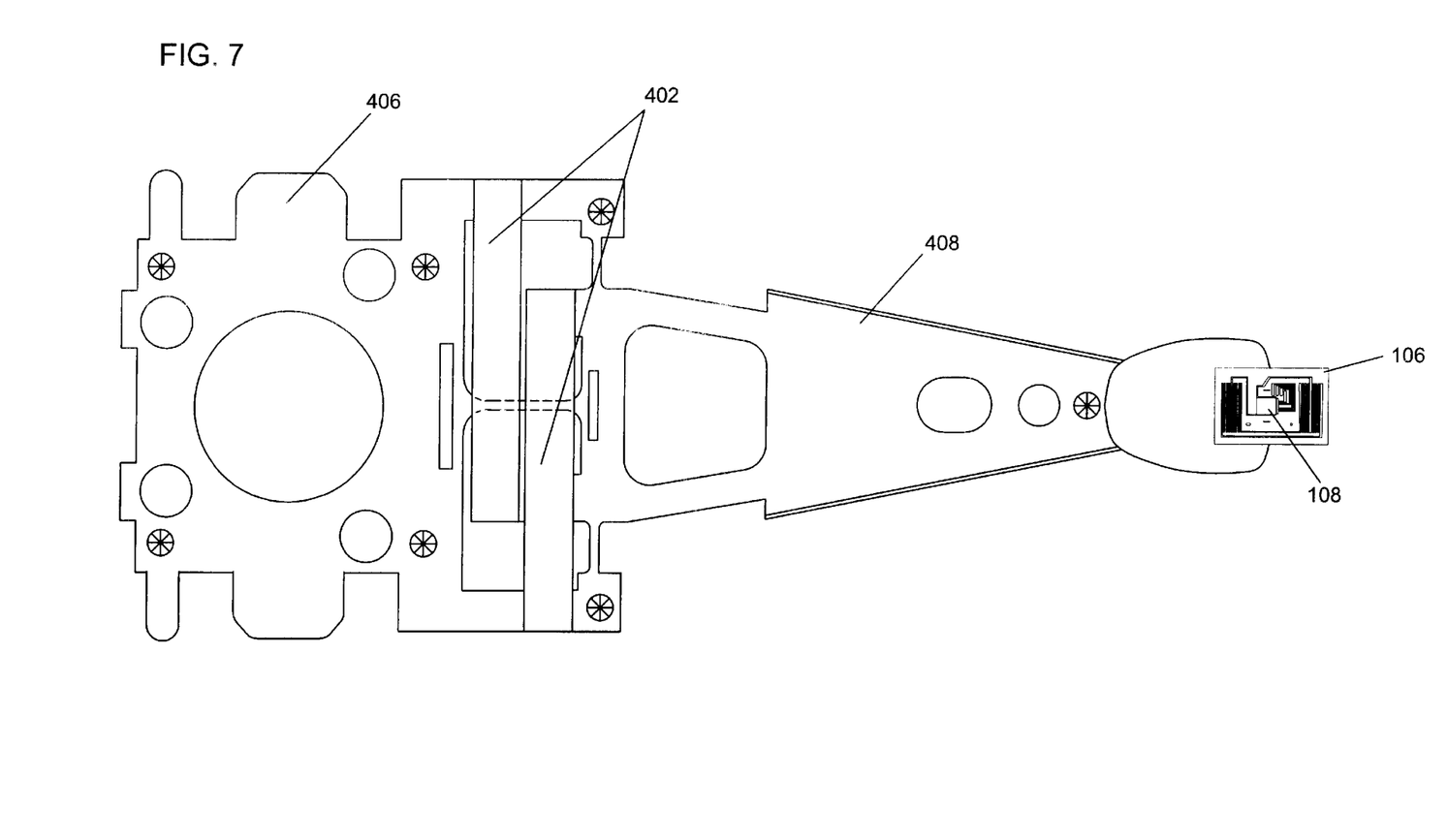
FIG. 7 is a top view of a head suspension assembly including a microactuator coupled to the load beam.

FIGS. 6 and 7 illustrate embodiments of head suspension assemblies similar to head suspension assembly 100 (FIG. 1) but also including microactuators for better track positioning of slider 108. FIG. 6 illustrates a bottom view of a portion of the head suspension assembly 300. In head suspension assembly 300, the flex circuit 304 has connections 306 that turn inwardly to make connection to electrical contacts (not shown) near the main body 310 of microactuator 308. Flex circuit 304 also includes electrical connections 318 that couple to socket 106. Microactuator 308 is bonded to bridge 134 and socket 108 is bonded to microactuator 308. Microactuator 308 includes thin flex arms 312 that allow for relative motion between socket 108 and bridge 134 when the microactuator 308 is actuated. Microactuator 308 may be operated by a positioning system of a slider tester (such as tester 200 of FIG. 5). Microactuators 402 (shown in FIG. 7) that couple to base plate 404 and load beam 406 are also capable of contracting or expanding to arcuately move slider 108 over a surface of a disc.

Figure 8:
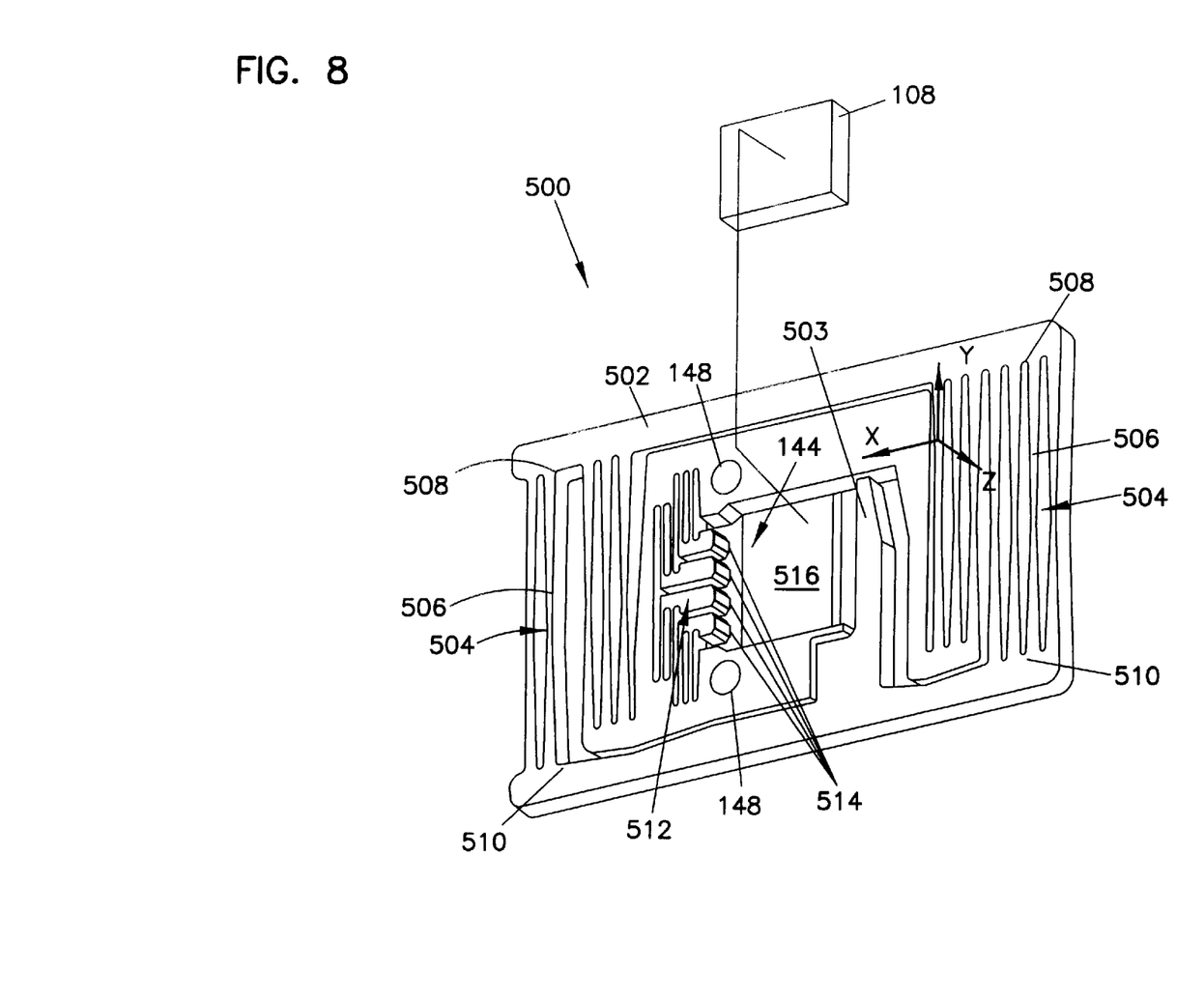
FIG. 8 is an exploded view showing the relationship between a socket and a slider in accordance with another embodiment of the present invention.
Figure 41:
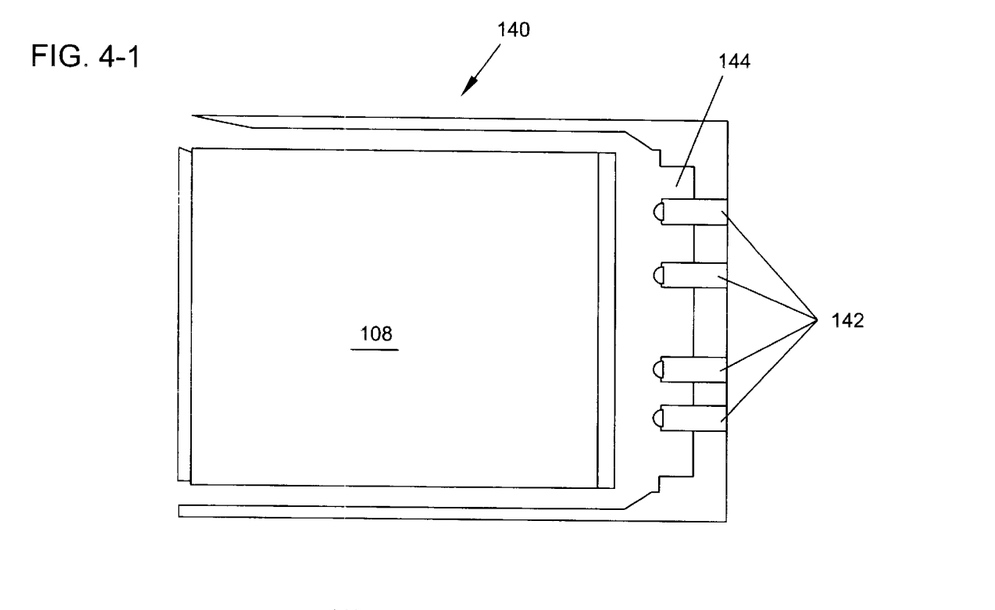
Figure 42:
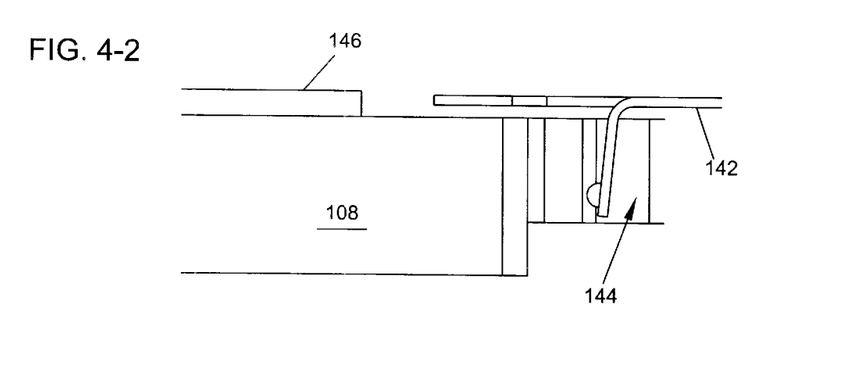
Figure 43:
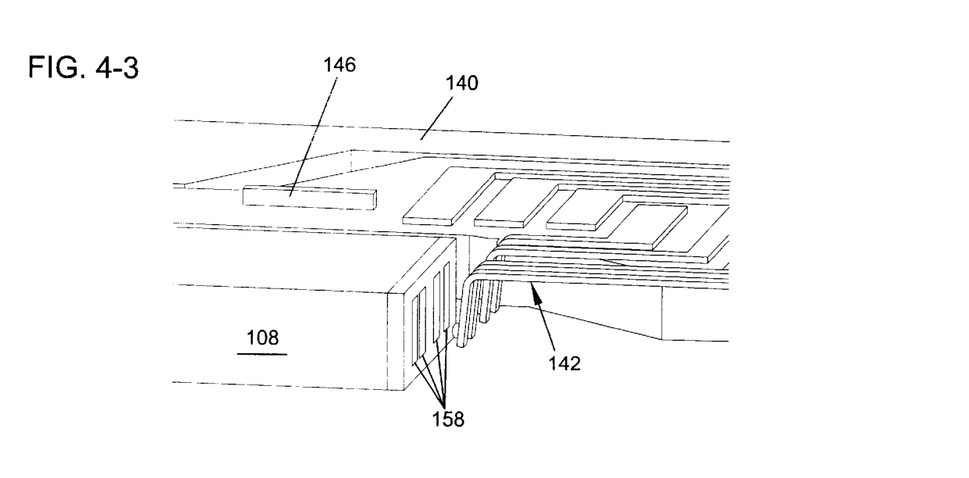
Figure 44:
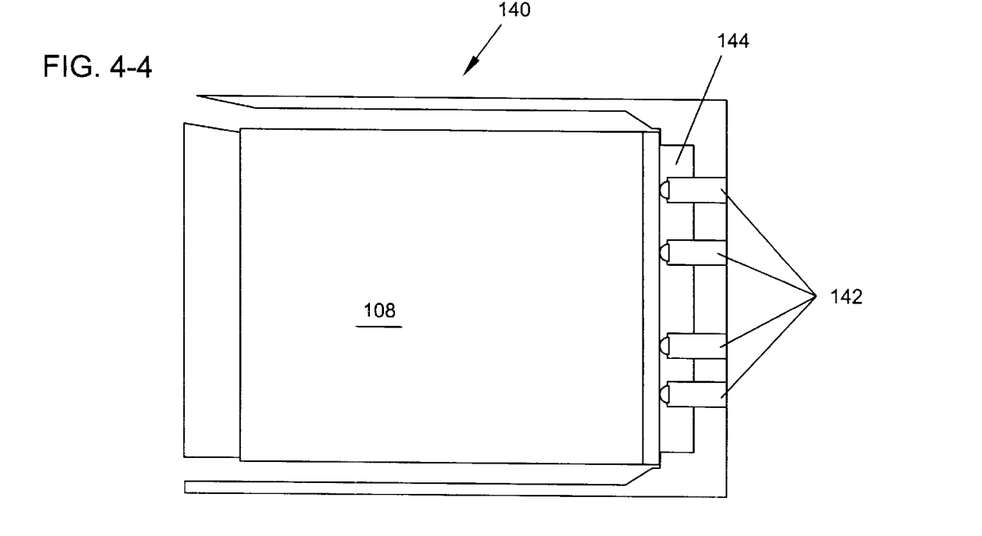
Figure 46:
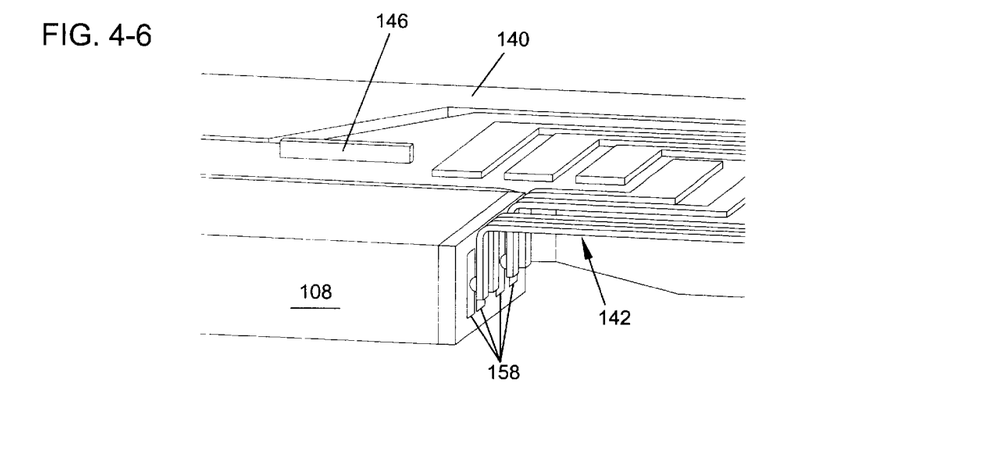

FIG. 8 is an exploded view showing the relationship between a socket and a slider in accordance with another embodiment of the present invention. Socket 500 corresponds generally with socket 106 which is illustrated in FIG. 3. Main body 502 of socket 500 is similar to main body 140 (FIG. 3) but includes additional enhancements which allow a smaller, more durable device. These enhancements include a tough electrically conductive coating to drain charges that could create electrostatic discharges, a hard, protective surface coating, an oxidation treatment to remove surface defects from the etched silicon, and tapered beams. The hard, protective surface coating is preferably a silicon nitride compound deposited by a high temperature low pressure chemical vapor deposition (CVD) process. The tough, electrically conductive coating preferably consists of a metal that is relatively hard, such as tantalum, titanium, chromium, iron, molybdenum, nickel or cobalt, or an alloy of these metals. If both the electrically conductive, tough metal layer and the hard, protective layer are used, the hard protective layer is applied to the silicon after the oxidation treatment, with the conductive layer applied over the hard protective layer. As can be seen in FIG. 8, individual beams 506 of beam springs 504 are tapered or have a non-uniform cross section along the Y-axis in the region between first ends 508 and second ends 510. Beams 504 are tapered to develop uniform stress over substantially the entire length of the beams, providing more effective use of the beam material, so that the same clamping force can be achieved with the same maximum beam stress with a smaller overall device size. Flexible fingers 512, that include contact pads 514, are included instead of electrical contacts 142 (FIG. 3). Fingers 512 deflect about 10 $\mu$m when slider 108 is clamped in place. An electrical interconnect, such as flex circuit, is folded down at about 90° over contact pads 514 so that when slider 108 is clamped in place, the individual contact pads press individual leads or flexible electrical contacts of the electrical interconnect against bond pads (not shown here) of slider 108, making temporary contact for electrical testing. The individual leads of the flex circuit may be coated with hard gold at the ends that make press contact with slider bond pads. The hard gold coating significantly increases the life of the flex circuit. Tub cap 516 is included to hold slider 108 at a substantially precise height along the Z-axis. A top surface of tub cap 516 serves as a standoff cap that bonds to a gimbal of an armature (not shown here). Socket 500 is substantially stiff in the vertical or Z-axis direction and also in the Y-axis direction, so that clamp bar 503 (similar to bar 143 of FIG. 1) moves in a straight line in the X-axis direction as slider 108 is clamped. In order to provide movement of clam bar 503 in the X-axis direction, without motion in the Y-axis direction, which would introduce an undesirable rocking effect of the slider position, the beams 504 are arranged in a folded flexure configuration. The remaining elements of socket 500 are similar to the elements of socket 106 of FIG. 3.

Embodiments of sockets (106, 500), described above, include elements such as beams (152, 506) which are spaced apart by about 50 $\mu$m. Due to the small size of these elements and very small spacing between them, conventional machining techniques, such as photochemical etching and electrical discharge machining are not suitable for fabrication of sockets (106, 500). Sockets (106, 500) have been successfully fabricated using deep reactive ion etching (DRIE), plated fabrication, and silicon mould processes which are described below.

The DRIE silicon fabrication process takes place in batch form (an array of sockets are simultaneously fabricated) on a silicon substrate, similar to standard semiconductor fabrication processes. In general, this process involves DRIE of beam and tub structures on a first side of a silicon wafer and DRIE of standoffs on a second side of the silicon wafer, which is opposite the first side. The DRIE silicon fabrication process is described in detail below.

The DRIE silicon fabrication process involves first growing a silicon dioxide mask layer on a silicon wafer that is about 250 $\mu$m thick. A photoresist pattern with beam and tub patterns is coated on the silicon dioxide mask layer. Reactive ion etching of the silicon dioxide mask layer down to the silicon surface is then carried out to transfer the beam and tub pattern from the photoresist to the silicon dioxide layer. This is followed by stripping the photoresist layer with oxygen plasma ash leaving a patterned mask layer on the silicon wafer. DRIE of the beam and tub structure down the silicon wafer to a depth of about 200 $\mu$m is then carried out. The silicon dioxide mask is then stripped using hydrofluoric acid. This is followed by rinsing and drying of the wafer.

After rinsing and drying, the wafer is flipped and a photoresist pattern with a standoff cap mask is applied. DRIE of the standoff cap through the wafer to the beams and tub is then carried out. This is followed by plasma stripping of the photoresist mask and then growing a silicon dioxide film using a high-temperature oxidation furnace, to convert the damaged outer etched silicon surfaces to silicon dioxide. The silicon dioxide film is then stripped off to expose a smoothed, defect free silicon surface. A silicon nitride film is deposited on the silicon surface to provide mechanical encapsulation. Metalization of the socket is then carried out by a sputtering process to provide a conductive surface. The fabricated sockets are then released out of the wafer frame by breaking silicon retention tabs. This can be carried out by methods such as torqing the socket to cause brittle fracture of silicon retention tabs.

Several variations in the above-described DRIE silicon fabrication process are possible. These include reversing the order of the standoff cap photo and etch processes with the beam and tub photo and etch processes; using different coating materials; and bonding/gluing of non-silicon standoff caps.

As mentioned above, the DRIE process involves the fabrication of silicon sockets. A non-silicon socket-may be fabricated using a plated fabrication process that takes place in batch form on a substrate, similar to standard semiconductor fabrication processes. This process involves first depositing a metal seed layer, such as Ta, on a silicon wafer. A metal film of about 50 $\mu$m is then plated on the seed layer and serves as a standoff cap layer. A photo pattern, which is the inverse of the beam and tub structure, is then coated on the standoff cap layer. The photo pattern is about 200 $\mu$m thick and is usually a photosensitive epoxy mold. The exposed portions of the standoff cap layer between the photo pattern are plated up with metal within the mold. If the metal plating goes above the surface of the mold, a lapping/chemical mechanical planarization step is performed to remove excess material. After metal plating, the photo pattern mold is extracted using boiling methanol, for example. This leaves the silicon wafer adjacent a first surface of the standoff cap layer and the plated metal beams and tub sides projecting from a second surface of the standoff cap layer. The standoff cap layer with the plated metal structure is then released from the silicon wafer by wet etching the silicon wafer with potassium hydroxide or wet etching the seed layer. The standoff cap layer with the plated structure is then flipped and mounted to a thermal release film with the plated structure in contact with the thermal release film. A photoresist etch mask is then photopatterned on the standoff cap layer. This is followed by wet etching the standoff cap layer to form the standoff cap and then stripping the photoresist layer. The thermal release film is then removed by heating to provide a fabricated socket.

Several variations in the plated fabrication process are possible. These include using alternative plating mold materials such as photoresist, polyimide, etc.; using a pre-formed metal substrate rather than plating up the cap layer; and using different metals for the standoff cap layer and the plated beam and tub structure layer.

Non-silicon sockets may also be formed by a silicon mold process which combines the etching capabilities of the DRIE etching of silicon with the non-silicon material options presented by the plated fabrication process. The silicon mold process also takes place in batch form on a substrate, similar to standard semiconductor fabrication processes. An inverse of the beam and tub structure is first etched into a silicon wafer that serves as a mold. The mold is typically about 200 $\mu$m deep. The silicon mold is then coated with a sacrificial film and seed layer that conforms to the etched pattern. The mold is then back-filled by plating or depositing structural material, such as NiCo, into the silicon mold. Lapping or chemical mechanical planarization is then performed to remove material that projects above the surface of the mold. The structural material within the mold forms the beam structures and the tub sides. A seed layer is then deposited across the top surface of the mold and a photoresist pattern for the standoff cap is then coated on the seed layer. The photoresist coating is then stripped and the thin seed layer film is then ion-milled away from the top of the wafer surface. The mold is then removed by a wet etching process to provide the fabricated socket. Variations such as low pressure chemical vapor deposition or metal organic chemical vapor deposition of structural material rather than plating are also possible in the silicon mold process described above.

In summary, a head suspension assembly (100) for a slider tester is provided, which includes load beam assembly (102) and socket (106, 500) that is coupled to load beam assembly (102). The assembly also includes electrical interconnect, provided for example by flex circuit (104). The socket (106, 500) is adapted to releasably secure a slider (108) and to electrically couple the flex circuit (104) to the slider (108).

In one embodiment of the head suspension assembly (100), the socket (106, 500) includes a clamp bar (143, 503), which urges slider (108) against a contact region 144.

Another embodiment of the present invention is directed to a method of making a head suspension assembly (100) for a slider tester. The method includes providing load beam assembly (102), a flex circuit (104) and a socket (106) adapted to releasably secure a slider (108) and to electrically couple the flex circuit (104) to the slider (108). The method also includes coupling the socket (106) to the load beam assembly (102) and attaching the flex circuit (104) to the load beam assembly (102) and the socket (106) such that the flex circuit (104) is supported by the load beam assembly (102) and is electrically coupled to the socket (106).

It is to be understood that even though numerous characteristics and advantages of various embodiments of he invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the head suspension assembly while maintaining substantially the same functionality without departing from the scope and spirit of the present invention. In addition, although the preferred embodiment described herein is directed to a head suspension assembly for a slider tester, it will be appreciated by those skilled in the art that the teachings of the present invention are not limited to slider testing systems and can be applied to other systems that employ sliders, without departing from the scope and spirit of the present invention.

What is claimed is:

1. A head suspension assembly for a slider tester, comprising:
   a load beam assembly including a load beam and a gimbal;
   a socket coupled to the gimbal, the socket adapted to releasably secure a slider; and an electrical interconnect adapted to releasably couple to the slider when the slider is secured in the socket.

2. The apparatus of claim 1 wherein the electrical interconnect includes flexible electrical contacts that electrically couple the slider to electrical conductors, which electrically couple signals from remote circuitry to and from the slider when the slider is secured in the socket.

3. The apparatus of claim 1 wherein the socket includes a clamp bar and a contact region and wherein the clamp bar urges the slider against the contact region.

4. The apparatus of claim 3 wherein the socket includes beam springs configured to adjust the clamp bar to clamp or release the slider.

5. The apparatus of claim 4 wherein individual beams of the beam springs extend between a first end and a second end in a direction parallel to a longitudinal axis between the first end and the second end.

6. The apparatus of claim 5 wherein a first group of individual beams of the beam springs couple to a fixed member at the first end and couple to a shuttle bar at the second end, and a second group of individual beams of the beam springs couple to a rotor section at the first end and couple to the shuttle bar at the second end.

7. The apparatus of claim 5 wherein a width of each individual beam of the beam springs in a direction perpendicular to the longitudinal axis and parallel to a top surface of the socket at the first end and the second end is greater than a width of a middle portion of the individual beam of the beam springs, such that the individual beam is tapered from the middle portion towards the first end and the second end.

8. The apparatus of claim 1 wherein the socket is a micro-electro-mechanical system (MEMS).

9. The apparatus of claim 1 wherein the socket is formed from silicon.

10. The apparatus of claim 1 wherein the socket includes a hard, protective coating.

11. The apparatus of claim 10 wherein the coating is a silicon nitride compound.

12. The apparatus of claim 1 wherein the socket includes a tough, electrically conductive coating.

13. The apparatus of claim 12 wherein the electrically conductive coating is formed of a metal selected from the group consisting of tantalum, titanium, chromium, iron, molybdenum, nickel and cobalt.

14. The apparatus of claim 1 wherein the socket includes locating features for pinning the socket to a fixture plate for loading and unloading the slider.

15. The apparatus of claim 1 wherein the socket includes standoffs that are bonded to the gimbal.

16. The apparatus of claim 1 further comprising a microactuator coupled to the load beam, the microactuator adapted to provide for fine positioning of the slider relative to a disc surface.

17. A slider tester employing the head suspension assembly of claim 16.

18. A head suspension assembly for a slider tester, comprising:
a load beam assembly including a load beam and a gimbal;
a microactuator coupled to the gimbal, the microactuator adapted to provide for fine positioning of a slider relative to a disc surface;
a socket coupled to the microactuator, the socket adapted to releasably secure the slider; and
an electrical interconnect adapted to releasably couple to the slider when the slider is secured in the socket.

19. The apparatus of claim 18 wherein the electrical interconnect includes flexible electrical contacts that electrically couple the slider to electrical conductors, which electrically couple signals from remote circuitry to and from the slider when the slider is secured in the socket.

20. The apparatus of claim 18 wherein the socket includes a clamp bar and a contact region and wherein the clamp bar urges the slider against the contact region.

21. The apparatus of claim 18 wherein the socket includes beam springs configured to adjust the clamp bar to clamp or release the slider.

22. A slider tester employing the head suspension assembly of claim 18.

23. A slider tester employing the head suspension assembly of claim 1.

24. A method of making a head suspension assembly for a slider tester, comprising the steps of:
(a) providing a load beam assembly;
(b) providing an electrical interconnect;
(c) providing a socket adapted to releasably secure a slider and to electrically couple the electrical interconnect to the slider;
(d) coupling the socket to the load beam assembly; and
(e) attaching the electrical interconnect to the head suspension assembly such that the electrical interconnect is electrically coupled to the socket.

25. The method of claim 24 wherein the socket is formed by a deep reactive ion etching (DRIE) silicon fabrication process.

26. The method of claim 24 wherein the socket is formed by a plated fabrication process.

27. The method of claim 24 wherein the socket is formed by a silicon mold fabrication process.

28. A head suspension assembly for a slider tester, comprising:
a load beam assembly;
means for releasably mounting a slider and for electrically coupling an electrical interconnect to the slider.

* * * * *